(12) United States Patent
Moore

(10) Patent No.: US 10,753,518 B2
(45) Date of Patent: Aug. 25, 2020

(54) HINGED LID ASSEMBLY FOR A FLANGED RISER AND METHODS OF USE THEREOF

(71) Applicant: Promus Engineering, LLC, Chattanooga, TN (US)

(72) Inventor: Chanc Moore, Woodstock, GA (US)

(73) Assignee: PROMUS ENGINEERING, LLC, Chattanooga, TN (US)

( * ) Notice: Subject to any disclaimer, the term of this patent is extended or adjusted under 35 U.S.C. 154(b) by 57 days.

(21) Appl. No.: 16/293,596

(22) Filed: Mar. 5, 2019

(65) Prior Publication Data

US 2019/0271422 A1 Sep. 5, 2019

Related U.S. Application Data

(60) Provisional application No. 62/638,923, filed on Mar. 5, 2018.

(51) Int. Cl.
| | |
|---|---|
| *F16L 55/115* | (2006.01) |
| *F16L 19/02* | (2006.01) |
| *F16L 19/025* | (2006.01) |
| *F16L 23/00* | (2006.01) |

(52) U.S. Cl.
CPC ......... *F16L 19/0212* (2013.01); *F16L 19/025* (2013.01); *F16L 23/003* (2013.01); *F16L 55/1152* (2013.01)

(58) Field of Classification Search
CPC .... F16L 19/0212; F16L 19/025; F16L 23/003
USPC .......... 138/89, 109; 285/364, 368; 220/325, 220/324, 264
See application file for complete search history.

(56) References Cited

U.S. PATENT DOCUMENTS

| | | | |
|---|---|---|---|
| 1,480,544 A | 1/1924 | Cox | |
| 1,593,041 A | 7/1926 | Stewart | |
| 1,978,607 A | 10/1934 | Straty | |
| 2,361,186 A | 10/1944 | Fishbein et al. | |
| 3,360,155 A | 12/1967 | Colonna | |
| 4,379,513 A | 4/1983 | Basterfield et al. | |
| 5,105,966 A * | 4/1992 | Fort | F16J 13/00 220/327 |
| 5,366,317 A | 11/1994 | Solimar | |
| 6,095,365 A * | 8/2000 | Yielding | B65D 90/10 105/377.07 |
| 6,315,147 B1 | 11/2001 | Bachmeier | |

(Continued)

*Primary Examiner* — Patrick F Brinson
(74) *Attorney, Agent, or Firm* — Matthew L. Grell; Jeffrey C. Watson; Grell & Watson Patent Attorneys LLC

(57) ABSTRACT

A quick-access hinged lid assembly for flanged riser, having two-part clamp, having an inner face shaped to conform to the surface flanged riser, first clamp ring and second clamp ring are connected by a clamp hinge, a lid having an exterior surface and an interior sealing surface to abut the flanged riser exterior surface, wherein the interior sealing surface includes annular groove, gasket or o-ring positioned therein groove to seal flanged riser exterior surface and interior sealing surface, a lid hinge configured between clamp and lid, lid hinge having a swing bolt slot and pin bolt to provide adjustment of the lid to enable the lid to mate flat with flanged riser, swing bolts positioned on the perimeter and pivotable from the clamp ring with hand operable fasteners to press gasket between interior sealing surface of the lid and flanged riser exterior surface in a closed position.

19 Claims, 4 Drawing Sheets

(56) References Cited

U.S. PATENT DOCUMENTS

| | | | |
|---|---|---|---|
| 6,824,140 B2 * | 11/2004 | Frew | F16J 15/122 |
| | | | 277/637 |
| 7,770,526 B2 * | 8/2010 | Drager | F16J 13/18 |
| | | | 105/377.05 |
| 8,166,891 B2 * | 5/2012 | Borowski | B61D 5/08 |
| | | | 105/377.05 |
| 8,196,523 B2 * | 6/2012 | Blevins, Jr. | B29C 43/027 |
| | | | 105/377.05 |

* cited by examiner

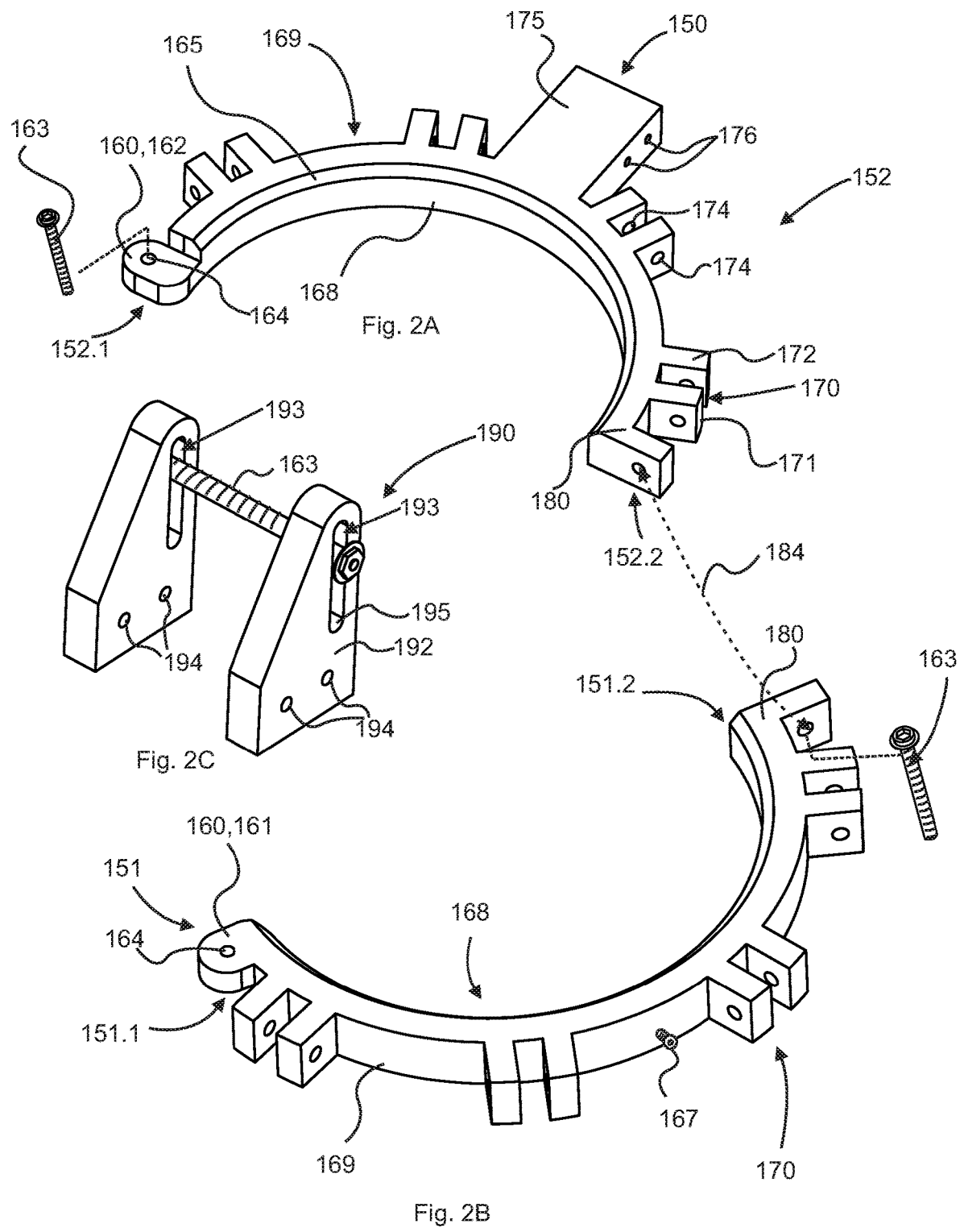

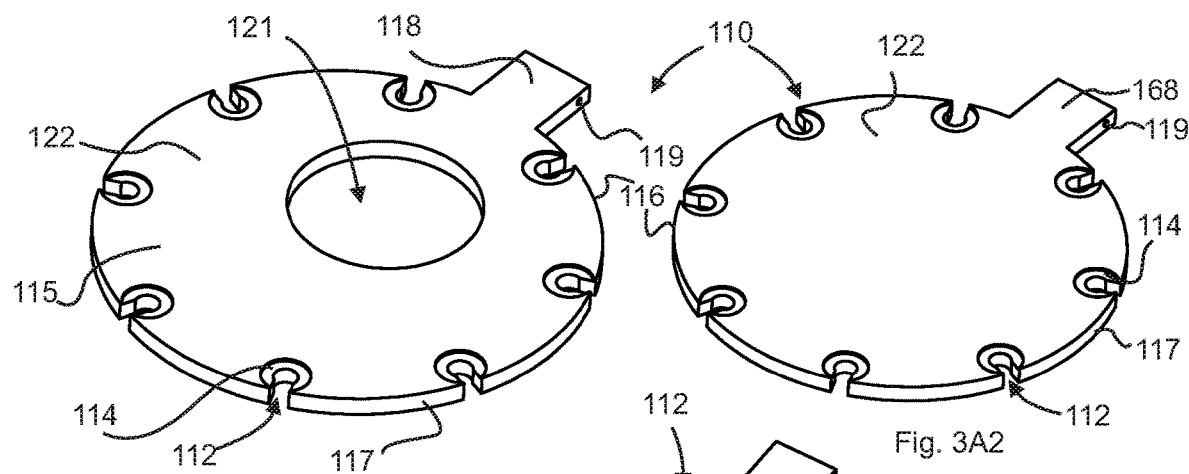
Fig. 3A1  Fig. 3A2
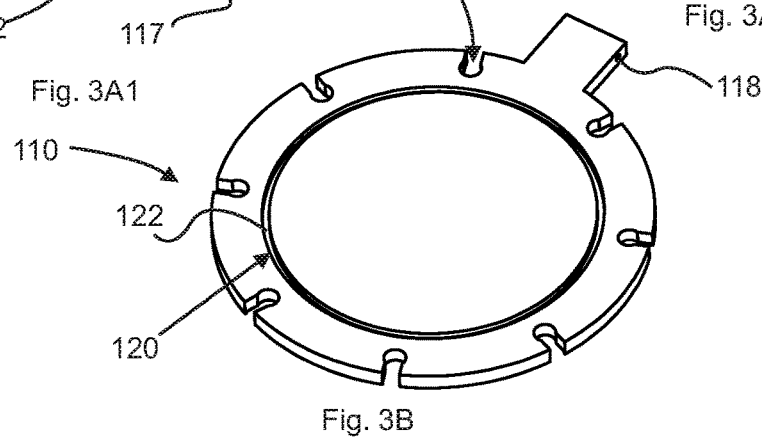
Fig. 3B
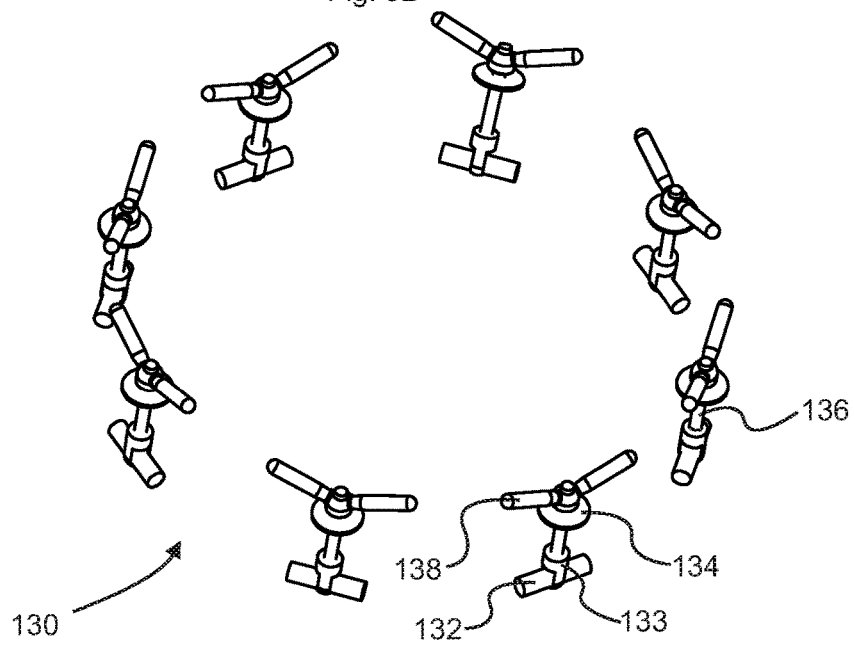
Fig. 3C

HINGED LID ASSEMBLY FOR A FLANGED RISER AND METHODS OF USE THEREOF

CROSS-REFERENCE TO RELATED APPLICATIONS

To the full extent permitted by law, the present U.S. Non-provisional Patent Application hereby claims priority to and the full benefit of, U.S. Provisional Application No. 62/638,923, filed on Mar. 5, 2018, entitled "A System to Provide a Lid, Flange Adapter and Backup Ring Providing Access to and Sealing of Risers and Methods of Use", which is incorporated by reference herein in its entirety.

FIELD OF THE DISCLOSURE

The present disclosure is directed to a sealing device for pipe or conduit and methods of use thereof. More specifically, the present disclosure is directed to an accessory field mountable to a pipe or conduit for sealing and providing access to the interior of the pipe or conduit for quick access to pumps or other tooling requirements.

BACKGROUND

Various approaches have been utilized to submerge drains, sensors, pumps for gas, fluids, or sludge beneath the surface in pipes and conduits. For example, positioning sensors, pumps for gas, fluids, or sludge beneath the surface of landfills is accomplished by side slope access and extraction applications. Perforated pipe or conduit is laid above a lower landfill liner in the basin of the landfill area and typically run horizontal a predetermined distance and then connected to a riser that slopes at an angle or rises vertically to the surface and eventually penetrates an upper liner. This riser is utilized as an access port for sensors, pumps, power cables, control and sensor cables, pump piping, connectors, and the like. An end-seal of the riser pipe is beneficial to minimize fugitive gases or odors while providing access to the sensors, pumps, power cables, control and sensor cables, pump piping, connectors, and the like when necessary.

One previous approach provides a pipe or conduit with flanged end where the flanged end has a plurality of holes therethrough to receive a bolt(s) or bolt(s) and nut(s) type mechanical connector(s). In addition, an end plate configured as a disk (or blind) has corresponding plurality of holes therethrough to receive a bolt(s) or bolt(s) and nut(s) type mechanical connector(s) to cinch the end plate to the flange to seal the pipe or conduit and provide access to the interior of the pipe or conduit when removed. One disadvantage or drawback to this approach is that to open, all the bolts and nuts are removed using two wrenches and often some are lost or dropped requiring frequent replacement and lengthy times to access the interior when removing and replacing the access blind. To close by replacing the blind, workers must align one hole and temporarily hold the lid using one of the bolts and nuts previously removed, pivot the lid about the single bolt holding it to align the other holes in the lid to the two-part semi-circular or one-part circular clamp. The worker must take care not to fold or damage the gasket between the lid and flange while performing the replacement.

Another previous approach provides a pipe or conduit with flanged end where the flanged end includes a two-part semi-circular or one-part circular clamp secured to the pipe or conduit prior to the flange (a backup ring). The backup ring assembly has a plurality of holes therethrough to receive a bolt or bolt and nut type mechanical connector. In addition, an end plate configured as a disk (a blind) connected via a fixed pin hinge to two part semi-circular clamp and has corresponding plurality of holes therethrough to receive a bolt or bolt and nut type mechanical connector to cinch the end plate to the flange to seal the pipe or conduit and provide access to the interior of the pipe or conduit. One disadvantage or drawback to this approach is that the bolts and nuts are often lost or dropped requiring frequent replacement and lengthy times to access the interior when removing and replacing the access blind. Another disadvantage or drawback to this approach is that the backup ring is difficult to steady particularly during the alignment of the holes in the backup ring and blind. Additionally, there is no fixed hinge and the lack of connection between the backup ring and blind further exacerbates the difficulty of steadying and alignment of the holes in each.

Therefore, it is readily apparent that there is a need for a hinged lid assembly for a flanged riser that functions to seal and provide access to the interior of the pipe or conduit for quick access to sensors, pumps, power cables, control and sensor cables, pump piping, connectors, and the like, enable a combination of features including ease of assembly in the field, durability, and access without hand tools, relatively inexpensive to manufacture and maintain, ease of assembly, and safe operation. The instant disclosure is designed to address at least certain aspects of the problems or needs discussed above by enabling the operator to access the riser without hand tools and without losing any of the hardware needed to seal the riser after use. Moreover, the instant disclosure is designed to enable an adjustable hinge capable of enabling the end plate to seat flush against the flange to form a proper seal. The instant disclosure is additionally designed to retro-fit onto existing flanged riser structures without significant modification to the riser or flange.

SUMMARY

Briefly described, in an example embodiment, the present disclosure may overcome the above-mentioned disadvantages and may meet the recognized need for a hinged lid assembly for a flanged riser, having a two-part clamp or back-up ring, having an inner face shaped to conform to the surface flanged riser, first back-up ring and second back-up ring are connected to each other by a clamp hinge, a lid configured as a disk having an exterior surface and an interior sealing surface to abut the flanged riser exterior surface, wherein the interior sealing surface includes an annular groove, a gasket or o-ring positioned therein the groove to seal flanged riser exterior surface and interior sealing surface, a lid hinge configured between back-up ring and the lid, the lid hinge having a swing bolt slot and a pin bolt to provide two dimensional adjustment of the lid so as to enable the lid to mate flat with flanged riser, a plurality of swing bolts positioned on the perimeter and pivotable from the back-up ring with hand operable fasteners to press or abut the gasket or o-ring therebetween interior sealing surface of the lid and flanged riser exterior surface in a closed or assembled position.

Accordingly, in one aspect, the present disclosure may include a pass through orifice positioned in the lid to provide access therein the riser without having to break the seal for material pass through and supplemental access.

Accordingly, in another aspect, the present disclosure may include recessed washer cutouts positioned around the perimeter of the lid and configured to retain a washer integrated therewith each of the plurality of swing bolts and hand operable fasteners.

Accordingly, in still another aspect, the present disclosure may include at least one back-up ring set screw positioned in the back-up ring and configured to retain or temporarily hold the back-up ring proximate the flanged riser.

Accordingly, in still another aspect, the present disclosure may include a lid hinge having an extension and a recessed hinge bolt so as not to interfere with flange when swinging the lid to a closed position.

Accordingly, in still another aspect, the present disclosure may include a cutout positioned on an inner annular edge of the back-up ring so as not to interfere with flange fillet welds when gripping the back-up ring to the flanged riser exterior surface and when swinging the lid to a closed position.

In an exemplary embodiment of the sealing device for pipe having a flanged end, the sealing device having a back-up ring configured to be arranged on the pipe inward of the flanged end, the back-up ring having a pair of substantially semi-circular back-up ring sections hingedly connected by a clamp hinge positioned proximate a first end of the back-up ring sections and a second end of the back-up ring sections configured with a latch to secure the back-up ring in a closed position around the pipe, the back-up ring having a plurality of bolt supports radially positioned about an outer surface of the back-up ring, a lid configured as a disk (a blind) having a perimeter edge and a flat interior surface to abut the flanged end, the lid having a plurality of open ended bolt slots radially positioned about the perimeter edge, the lid incorporating an o-ring inset therein, a lid hinge to hingedly connect the lid to the back-up ring, the lid hinge having a ring tongue extending radially from an outer surface of the back-up ring, the ring tongue having a pair of hinge posts affixed to the ring tongue, each the pair of hinge posts having an adjustment slot, the lid hinge having a lid tongue extending radially from a perimeter edge of the lid, the lid tongue having a lid tongue aperture positioned between the pair of vertical hinge posts and aligned with the adjustment slot to receive a hinge pin and the hinge pin adjusts therein the adjustment slot to enable the lid to mate flat with the flanged end of the pipe, a plurality of swing bolts each pivotably affixed to one of the plurality of bolt supports and disposed to pivot therein one of the bolt slots, the plurality of swing bolts having a hand operable fastener to tighten and seal the lid to the flanged end.

In another exemplary embodiment of a method of sealing a flanged end of a pipe, the method having the steps of providing a pipe seal having a back-up ring, the back-up ring having a pair of substantially semi-circular back-up ring sections hingedly connected by a clamp hinge positioned proximate a first end of the back-up ring sections and a second end of the back-up ring sections configured with a latch, the back-up ring having a plurality of bolt supports radially positioned about an outer surface of the back-up ring, a lid configured as a disk having a perimeter edge and a flat interior surface to abut the flanged end, the lid having a plurality of open ended bolt slots radially positioned about the perimeter edge, the lid incorporating an o-ring inset therein, a lid hinge to hingedly connect the lid to the back-up ring, the lid hinge having a ring tongue extending radially from an outer surface of the back-up ring, the ring tongue having a pair of hinge posts affixed to the ring tongue, each the pair of hinge posts having an adjustment slot, the lid hinge having a lid tongue extending radially from a perimeter edge of the lid, the lid tongue having a lid tongue aperture positioned between the pair of vertical hinge posts and aligned with the adjustment slot, a plurality of swing bolts each pivotably affixed to one of the plurality of bolt supports, the plurality of swing bolts having a hand operable fastener, positioning the back-up ring on the pipe inward of the flanged end, and latching the back-up ring in a closed position around the pipe.

A feature of the hinged lid assembly for a flanged riser attachment device and methods of use thereof may include its ability to enable an operator to quickly and easily gain access to the pipes wiring, or vessels without the use of wrenches or similar tools to remove the lid.

A feature of the hinged lid assembly for a flanged riser attachment device and methods of use thereof may include its ability to provide captive bolts that swing out of the way for removal of the lid without having to completely remove the bolts. Removing bolts with traditional lids and backup rings often results in the bolts being dropped or otherwise lost.

Another feature of the hinged lid assembly for a flanged riser attachment device and methods of use thereof may include its ability to provide a lid with annular o-ring groove and an o-ring positioned therein is pre-aligned for better positioning rather than rubber gaskets typically used to seal the lid to the flange adapter which are typically separate and have to be manually positioned.

Another feature of the hinged lid assembly for a flanged riser attachment device and methods of use thereof may include its ability to provide a lid hinge configured between back-up ring and the lid, the lid hinge having a swing bolt slot to provide 2-dimensional adjustment of the lid so as to enable the lid to mate flat with flanged riser.

Another feature of the hinged lid assembly for a flanged riser attachment device and methods of use thereof may include its ability to provide a plurality of swing bolts positioned on the perimeter and pivotable from the back-up ring with hand operable fasteners to press or abut the o-ring therebetween interior sealing surface of the lid and flanged riser exterior surface in a closed or assembled position.

Another feature of the hinged lid assembly for a flanged riser attachment device and methods of use thereof may include its ability to provide time-savings by enabling field technicians to save at least approximately 30 minutes per riser access due to utilization of swing bolts with hand grips.

Another feature of the hinged lid assembly for a flanged riser attachment device and methods of use thereof may include its ability to enable a retro-fit and attachment onto existing flanged riser due to the split/hinged backup ring.

Another feature of the hinged lid assembly for a flanged riser attachment device and methods of use thereof may include its ability to provide an orifice (unless requested to be omitted) for an optional smaller diameter pass through portal for pump, tool, cable, etc. passage and sealed conduits into and out of the flanged riser.

Another feature of the hinged lid assembly for a flanged riser attachment device and methods of use thereof may include its ability to greatly reduce the time required to remove pumps (for repair or maintenance) that are typically accessed through the flanged riser.

Another feature of the hinged lid assembly for a flanged riser attachment device and methods of use thereof may include its ability to utilize stainless steel hardware, which is used in corrosive environments where this system would be installed. Stainless threads are susceptible to galling where the nut becomes "frozen" to the bolt. In prior systems, galled bolts are removed by sawing before they can be replaced. However, the plurality of swing bolts in this system may be replaced by simply removing the pin bolt from the lid hinge and replacing with new plurality of swing bolts.

Another feature of the hinged lid assembly for a flanged riser attachment device and methods of use thereof may include its ability to enable easy assembly at the site, ease of adjustability, and ease of operation.

These and other features of the hinged lid assembly for a flanged riser attachment device and methods of use thereof will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present hinged lid assembly for a flanged riser attachment device and methods of use will be better understood by reading the Detailed Description of the Preferred and Selected Alternate Embodiments with reference to the accompanying drawing Figures, in which like reference numerals denote similar structure and refer to like elements throughout, and in which:

FIG. 2A is an exploded view of the first back-up ring section of back-up ring two-part or split assembly, according to select embodiments of the instant disclosure;

FIG. 2B is an exploded view of the second back-up ring section of back-up ring two-part or split assembly, according to select embodiments of the instant disclosure;

FIG. 2C is an exploded view of the slotted hinge of back-up ring two-part or split assembly, according to select embodiments of the instant disclosure;

FIG. 3A1 is an exploded top view of one embodiment of the lid of the hinged lid assembly, according to select embodiment having a portal of the instant disclosure;

FIG. 3A2 is an exploded top view of an alternate embodiment of the lid of the hinged lid assembly, according to select embodiments of the instant disclosure;

FIG. 3B is an exploded bottom view of the alternate embodiment of the lid of the hinged lid assembly, according to select embodiments of the instant disclosure;

FIG. 3C is an exploded view of the swing bolts of the lid of the hinged lid assembly, according to select embodiments of the instant disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1A, 1B, 2A, 2B, 2C, 3A1, 3A2, 3B, 3C, and 4 specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figure 1A:
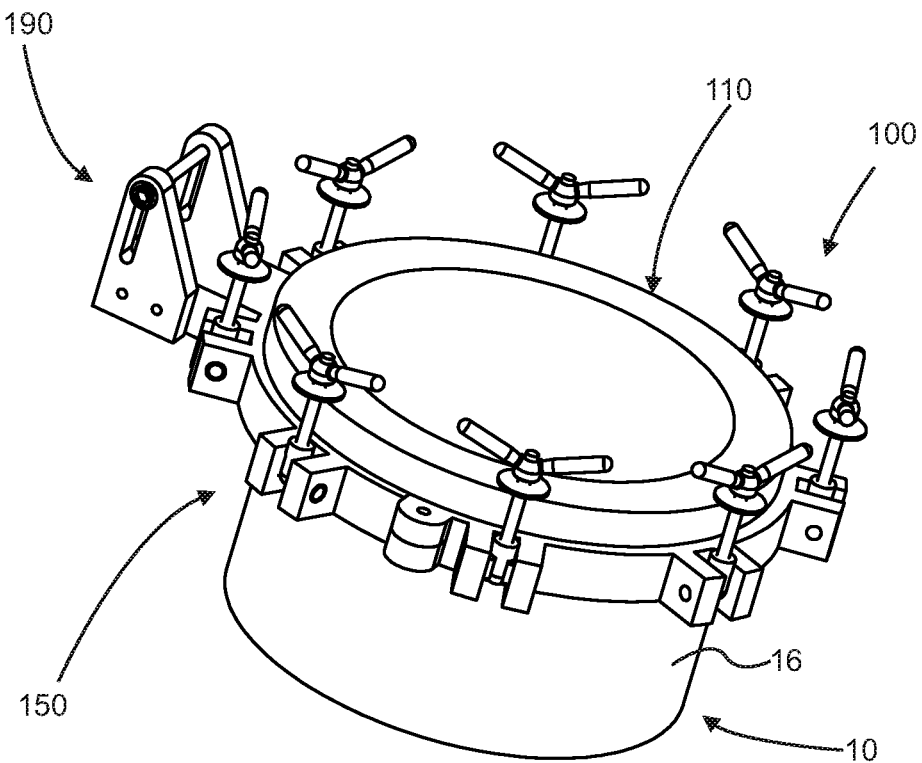
FIG. 1A is a perspective view of the hinged lid assembly affixed to a flanged riser shown in a closed position according to select embodiments of the instant disclosure.
Figure 1B:
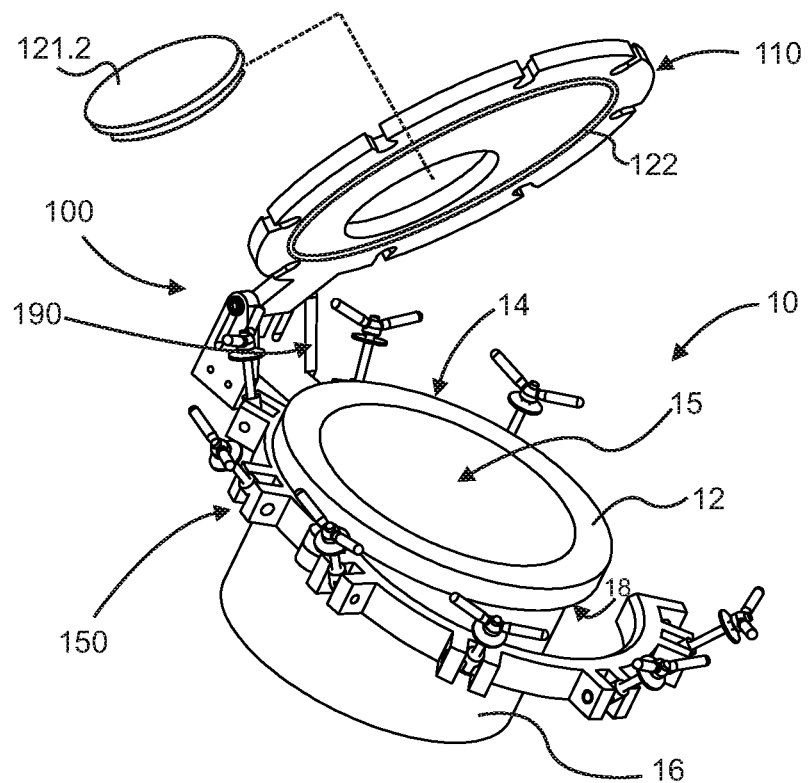
FIG. 1B is a perspective view of the hinged lid assembly affixed to a flanged riser shown in an open position according to select embodiments of the instant disclosure.

Referring now to FIGS. 1A and 1B, by way of example, and not limitation, there is illustrated an example embodiment of hinged lid assembly 100 shown affixed to a pipe or conduit, such as riser 10 having flanged end 12. Preferably hinged lid assembly 100 may be provided as a sealable lid, flange adapter and backup ring that provides a seal and access to the interior of riser 10 for quick access for pumps or other tooling and appurtenances. It is contemplated herein that riser 10 may be utilized for any application where riser 10 requires a seal and then unsealed for access thereto riser interior 15 and more specifically utilized as an access port for sensors, pumps, power cables, control and sensor cables, pump piping, connectors, and the like. A complete seal of riser 10 may be necessary to trap or collect gas and to protect sensors, pumps, power cables, control and sensor cables, pump piping, connectors, and the like from the caustic environment. Moreover, hinged lid assembly 100 may include two major parts, such as lid 110 configured as a disk and two-part clamp, such as back-up ring 150 with lid hinge 190 configured between lid 110 and back-up ring 150 adapted or to enable lid 110 to swing between an open position or access or inspection position shown in FIG. 1B and a closed or sealed position shown in FIG.1A.

Referring now to FIGS. 2A and 2B, by way of example, and not limitation, there is illustrated an example embodiment of back-up ring 150 configured to be arranged or positioned on exterior of riser 10 inward of flanged end 12 of hinged lid assembly 100. Preferably, back-up ring 150 may include two-part or split assembly pair of substantially semi-circular back-up ring sections hingedly connected to each other, such as first back-up ring section 151 and second back-up ring section 152 hingedly connected therebetween by clamp hinge 160 having first clamp hinge 161 positioned proximate first back-up ring end 151.1 of first back-up ring section 151 and second clamp hinge 162 positioned proximate first back-up ring end 152.1 of second back-up ring section 152 to conform to the curvature and enable retro-fit, and attachment of back-up ring 150 onto existing structures, such as riser 10. Moreover, a locking mechanism like bolt and nut or the like, such as clamp pin 163 may be inserted therethrough a hole, such as clamp hinge aperture 164 formed therein first clamp hinge 161 and second clamp hinge 162 to enable first clamp hinge 161 and second clamp hinge 162 as well as first back-up ring section 151 and second back-up ring section 152 to pivot or hingedly swing about clamp hinge 160. It is contemplated herein that first back-up ring section 151 and second back-up ring section 152 of back-up ring 150 may be configured having ring interior surface 168 shaped or dimensioned to conform to exterior surface 16 of riser 10 to hingedly fit curvature of riser 10 and be configured in a shape, such as half or semi-circle to grip riser 10 proximate flanged end 12 as shown in FIGS. 1A and 1B. Furthermore, the free end, such as second back-up ring end 151.2 of first back-up ring section 151 and second back-up ring section 152 may include a fastener or flange, such as latch 180. Latch 180 may include first end tab 181 positioned proximate second back-up ring end 151.2 of first back-up ring section 151 and second end tab 182 positioned proximate second back-up ring end 152.2 of second back-up ring section 152, wherein a locking mechanism like bolt and nut or the like, such as tab pin 163 may be inserted therethrough a hole, such as end tab aperture 184 formed therein first end tab 181 and second end tab 182 to enable first end tab 181 and second end tab 182 as well as first back-up ring section 151 and second back-up ring section 152 to align, lock, or latch back-up ring 150 via clamp hinge 160 thereabout riser 10 in a closed position.

It is further contemplated herein that first back-up ring section 151 or second back-up ring section 152 of back-up ring 150 may include a hinge mount, extension, or tab, such as ring tongue 175 radially positioned proximate or arranged at its periphery or perimeter edge, such as ring surface 169 of first back-up ring section 151 or second back-up ring section 152. Ring tongue 175 may include a parallel protrusion or extension having one or more holes or hinge attachment apertures, such as ring tongue aperture 176 formed therein ring tongue 175. It is contemplated herein that ring tongue 175 may be configured as an extension so as lid 110 preferably will not interfere with flanged end 12 when swinging lid 110 to a closed position.

First back-up ring section 151 and second back-up ring section 152 of back-up ring 150 may include a plurality of bolt supports 170 radially positioned proximate or arranged at its periphery or perimeter edge, such as ring outer surface 169 of first back-up ring section 151 and second back-up ring section 152. Each bolt support 170 may include a pair of parallel protrusions or extensions, such as first bolt support 171 and second bolt support 172 with each support having a hole, such as bolt support aperture 174 formed therein first bolt support 171 and second wing bolt support 172 and configured to extend from ring surface 169.

It is further contemplated herein that first back-up ring section 151 and second back-up ring section 152 of back-up ring 150 may be hingedly positioned therearound riser exterior surface 16 of riser 10 and first end tab 181 positioned proximate second back-up ring end 151.2 of first back-up ring section 151 and second end tab 182 positioned proximate second back-up ring end 152.2 of second back-up ring section 152 may be attached via latch pin 163 securing back-up ring 150 thereto riser exterior surface 16 of riser 10. Moreover, back-up ring 150 may include at least one back-up ring 1 167 positioned therethrough back-up ring 150 and configured to retain back-up ring 150 proximate flanged end 12 of riser 10.

It is contemplated herein that back-up ring 150 may include a machined or formed bevel edge, such as ring cutout 165 formed thereon ring interior surface 168 to form an inner annular edge of back-up ring 150 so as not to interfere with fillet welds between riser 10 and flanged end 12 when back-up ring 150 grips riser exterior surface 16 of riser 10 and when lid 110 swings to a closed position.

Referring now to FIG. 2C, by way of example, and not limitation, there is illustrated an example embodiment of hinge bracket 190 of hinged lid assembly 100. Preferably, hinge bracket 190 may include vertical hinge posts, such as first hinge post 191 and second hinge post 192 having one or more holes or hinge attachment apertures, such as hinge posts aperture 194 formed therein each of first hinge post 191 and second hinge post 192. First hinge post 191 and second hinge post 192 may be affixed to ring tongue 175 via alignment of hinge posts aperture 194 formed therein each of first hinge post 191 and second hinge post 192 and clamp tongue aperture 176 formed therein ring tongue 175 and bolt and nut, or ring tongue pin 163 or the like positioned therethrough. It is contemplated herein that other devices or attachments known to one of ordinary skill in the art may be utilized herein to removeably attach two or more items herein, pieces or components herein. Moreover, first hinge post 191 and second hinge post 192 may include a slotted cutout, such as adjustment slot 193 whether position proximate edge 195 in a vertical configuration. It is contemplated herein that adjustment slot 193 may be horizontal, angled, vertical, or combinations thereof relative to edge 195 to provide two dimensional adjustment of lid 110 relative to flanged end 12 so as to enable lid 110 to mate flat with flanged end 12 of riser 10.

Referring now to FIGS. 3A1, 3A2, and 3B, by way of example, and not limitation, there is illustrated an example embodiment of lid 110 of hinged lid assembly 100. Preferably, lid 110 may be configured as a disc or flat circular disc or other shape or dimension to mate therewith back-up ring 150 to cover or seal riser 10. Lid may include a plurality of perimeter open ended slots or cutouts, such as bolt slots 112 spaced radially around or on an outer periphery, such as perimeter edge 116 of lid 110. Moreover, each bolt slots 112 may include a recessed cutout, such as washer slot 114 formed adjacent therein top surface, such as interior surface 115 of lid 110. It is contemplated herein that each one of plurality of bolt slots 112 aligns therewith or spaced about the circumference to correspond with one of plurality of bolt supports 170 or spaced across from one another at predetermined intervals about the circumference of lid 110 and back-up ring 150, respectively as shown in FIG. 1A. Furthermore, lid 110 may include a lid mount, extension, or tab, such as lid tongue 118 radially positioned proximate or arranged at its periphery or perimeter, such as lid perimeter edge 117. Lid tongue 118 may include a parallel protrusion or extension having one or more holes, such as lid tongue aperture 119 formed therein lid tongue 118.

It is contemplated herein that lid tongue 118 positioned therebetween first hinge post 191 and second hinge post 192 and more specifically lid tongue aperture 119 aligns therewith adjustment slot 193 to enable hinge mechanism like bolt and nut or the like, such as hinge pin 163 may be inserted therethrough (insertion) adjustment slot 193 and lid tongue aperture 119 to enable lid 110 to pivot hinge, lock, seal, or latch thereabout back-up ring 150 as shown in FIGS. 1A and 1B and provide two dimensional adjustment of lid 110 so as to enable lid 110 to abut or mate flat with flanged riser.

Still furthermore, lid 110 may include a sealed passthrough device, such as access portal 121 with removeable and sealable penetration port, such as cover plate 121.2 to enable passage through the lid 110 without its removal. It is contemplated herein that access portal's 121 hole size or location may vary by need or access requirement. Access portal 121 may be sized and configured as a quick access portal to enable access to sensors, pumps, fittings, vacuum connections, force-main discharge hoses, power cables, control and sensor cables, pump piping, connectors, equipment, and the like housed therein riser 10 and provide exit thereof without breaking the lid 110 seal.

Yet still furthermore, lid 110 may include a cutout, such as gasket groove 120 machined or formed therein bottom surface 124 of lid 110. Gasket groove 120 may form a continuous groove connected end-to-end (circular groove) and more specifically may form a circle positioned within or interior to bolt slots 112. Gasket groove 120 may be utilized to hold therein an integrated o-ring or the like, such gasket 122 positioned therein gasket groove 120 to seal bottom surface 124 of lid 110 thereto flanged end 12 of riser 10. It is contemplated herein that gasket 122 may be configured as an o-ring, as an o-ring may be integrated into lid 110 for better alignment since a worker does not have to worry about lining up gasket 122 holes in addition to the holes in the blind and back-up ring.

Referring now to FIG. 3C, by way of example, and not limitation, there is illustrated an example embodiment of a captive bolt or fastener, such as plurality of swing bolts 130 utilized to press and seal lid 110 thereto flanged end 12 of riser 10. It is contemplated herein that swing bolts 130 may be captive to back-up ring 150 such that they can pivot and provide specialized hand tighten and quick release for access or opening lid 110 without requiring their removal or hand tools. Preferably, swing bolt 130 may be configured with a t-shaped connector 133 with a sliding or removeable swing bolt pin 132 utilized to pivotably connect or to secure the latter swing bolt 130 in pivotal relation to one of bolt supports 170 of back-up ring 150. Moreover, swing bolt 130 may include a threaded extension, such as threaded bolt 136 and a nut, flat washer 134, and hand grips (wing-nut, knob or similar device), such as hand operable fasteners 138, which may be sufficiently tightened by hand. Moreover, swing bolt 130 may include a non-threaded bolt and pin or similar configuration to accomplish the same purpose as the threaded bolt. It is contemplated herein that swing bolts 130 are captive with bolt supports 170 of back-up ring 150, however, swing bolts 130 may be captive with lid 110 and the common parts reversed respectively between back-up ring 150 and lid 110.

In closed operation, when seal lid 110 is in a closed position proximate flanged end 12 of riser 10, each swing bolt 130 may be swung upward placing threaded bolt 136 therein bolt slots 112 and hand operable fasteners 138 above washer slot 114 formed therein exterior surface 115 of lid 110. Hand operable fasteners 138 may be rotated (rotation) around threaded bolt 136 tightening and pulling lid 110 or lid 110 may be brought into close engagement or contact with flanged end 12 with an o-ring, such as gasket 122 therebetween to seal of riser 10.

In open operation, hand operable fasteners 138 may be rotated around threaded bolt 136 above washer slot 114 formed therein interior surface 115 of lid 110 releasing lid 110 from flanged end 12 to unseal riser 10. Each swing bolt 130 may be swung downward removing threaded bolt 136 from bolt slots 112 and lid 110 may be hingedly swung open to enable access thereto riser interior 15 and more specifically utilized as an access port for sensors, pumps, power cables, control and sensor cables, pump piping, connectors, and the like.

Lid 110 and back-up ring 150 may be constructed of plastic or more specifically high density polyethylene or similar chemically resistant materials, as these plastic offers a variety of forms and shapes and resist corrosion; however, other suitable materials such as stainless steel metal, or the like, can be utilized, provided such material has sufficient strength and/or durability as would meet the purpose described herein.

Figure 4:
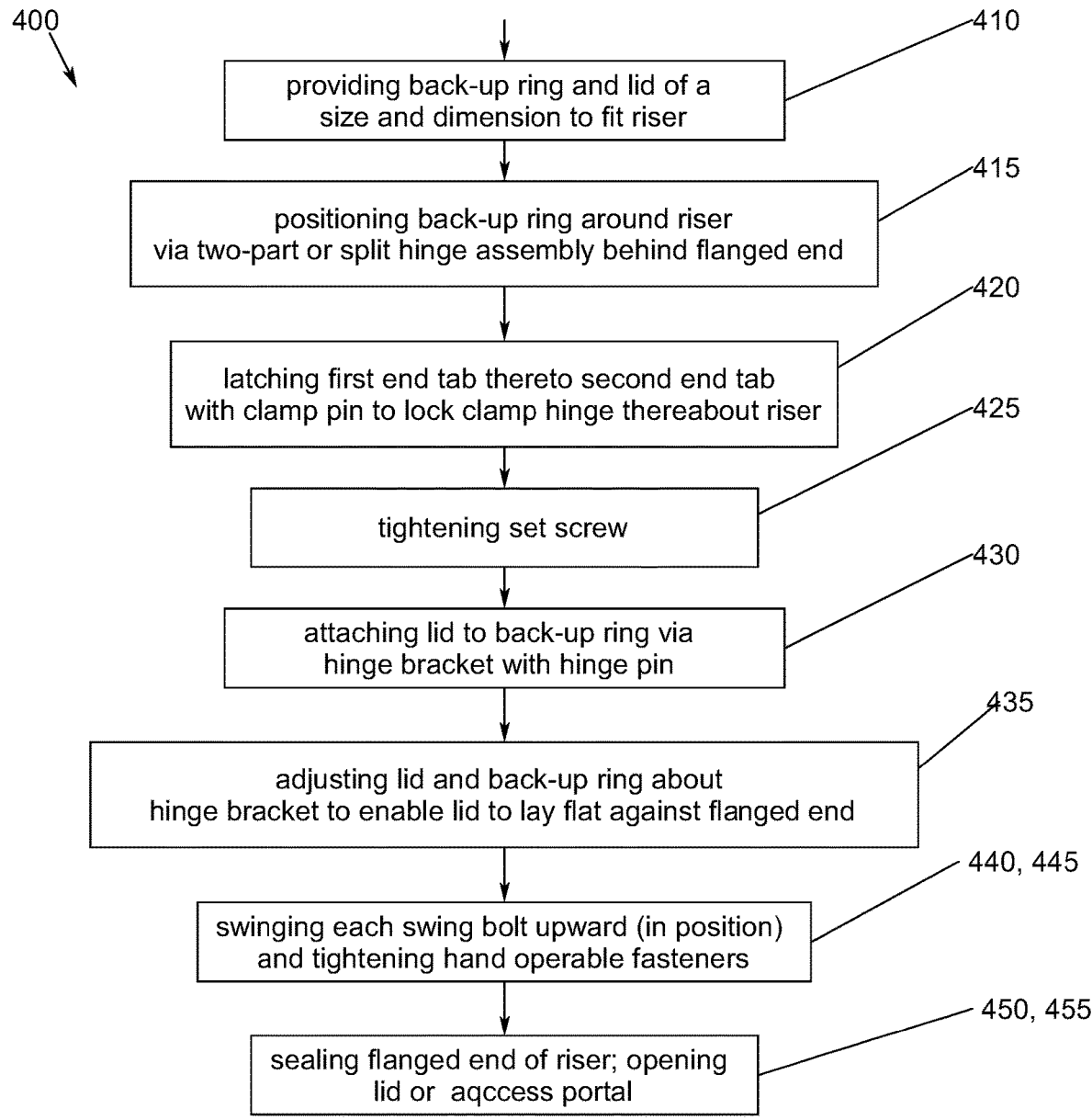
FIG. 4 is a flow diagram of a method of installation and use of hinged lid assembly affixed to a flanged riser according to select embodiments of the instant disclosure.

Referring now to FIG. 4, there is illustrated a flow diagram 400 of a method for installation of back-up ring 150 and lid 110 thereto riser 10. In block or step 410, providing back-up ring 150 and lid 110 of a size and dimension to fit riser 10 as set forth in any of the embodiments discussed herein, and/or shown in FIGS. 1-3. Remove any existing lid or cover. In block or step 415 positioning back-up ring 150 around riser 10 via two-part or split assembly, such as first back-up ring section 151 and second back-up ring section 152 hingedly connected therebetween by clamp hinge 160 behind flanged end 12. In block or step 420 latching first end tab 181 thereto second end tab 182 with clamp pin 163 to lock clamp hinge 160 thereabout riser 10. In block or step 425 tightening set screw 167 positioned therethrough back-up ring 150 to retain back-up ring 150 proximate flanged end 12 of riser 10. In block or step 430 attaching lid 110 to back-up ring 150 via hinge bracket 190 where hinge pin 163 may be inserted therethrough adjustment slot 193 and lid tongue aperture 119. In block or step 435 adjusting lid 110 and back-up ring 150 about hinge bracket 190 to enable lid 110 to lay flat, fit tight, mate up or position gasket 122 to flanged end 12 of riser 10, closed position. In block or step 440 swinging each swing bolt 130 upward (in position) placing threaded bolt 136 therein bolt slots 112 and hand operable fasteners 138 above washer slot 114 formed therein interior surface 115 of lid 110 and optionally loosen the set screw 167. In block or step 445 tightening hand operable fasteners 138 by rotating such around threaded bolt 136. In block or step 450 sealing flanged end 12 of riser 10 via tightening and pulling lid 110 into close engagement with flanged end 12 and pressing gasket 122 therebetween flanged end 12 and lid 110 to seal riser 10 and optionally re-tighten the set screw 167. In block or step 455 opening lid 110 via loosening hand operable fasteners 138 and swinging them out of bolt slots 112 or access portal 121 to enable passage or access to sensors, pumps, fittings, vacuum connections, force-main discharge hoses, power cables, control and sensor cables, pump piping, connectors, equipment, and the like housed therein riser 10.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

It is understood herein that various changes in the material used, shape, size (diameters of riser 10), arrangement of parts, and parts are connected with bolts, pins, screws or similar fasteners without departing from the spirit of the scope of the claims herein.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A sealing device for pipe having a flanged end connected via a fillet weld, said sealing device comprising:

a back-up ring configured to be arranged on the pipe inward of the flanged end, said back-up ring having a pair of substantially semi-circular back-up ring sections hingedly connected by a clamp hinge positioned proximate a first end of said back-up ring sections and a second end of said back-up ring sections configured with a latch to secure said back-up ring in a closed position around the pipe, said back-up ring having a plurality of bolt supports radially positioned about an outer surface of said back-up ring;

a lid configured as a disk having a perimeter edge and a flat interior surface to abut the flanged end, said lid having a plurality of open ended bolt slots radially positioned about said perimeter edge;

a lid hinge to hingedly connect said lid to said back-up ring, said lid hinge having a ring tongue extending radially from an outer surface of said back-up ring, said ring tongue having a pair of vertical hinge posts affixed to said ring tongue, each said pair of vertical hinge posts having an adjustment slot, said lid hinge having a lid tongue extending radially from a perimeter edge of said lid, said lid tongue having a lid tongue aperture positioned between said pair of vertical hinge posts and aligned with said adjustment slot to receive a hinge pin and said hinge pin adjusts therein said adjustment slot to enable said lid to mate flat with the flanged end of the pipe;

a plurality of swing bolts each pivotably affixed to one of said plurality of bolt supports and disposed to pivot therein one of said bolt slots, said plurality of swing bolts having a hand operable fastener to tighten and seal said lid to the flanged end.

2. The sealing device of claim 1, wherein said back-up ring further comprises an interior surface having a cutout configured to protect the fillet weld between the pipe and the flanged end.

3. The sealing device of claim 1, wherein said back-up ring further comprises a set screw positioned therethrough said back-up ring from an exterior surface, said set screw configured to retain said back-up ring proximate the flanged end of the pipe.

4. The sealing device of claim 1, wherein said clamp hinge further comprises a first clamp hinge positioned proximate a first end of a first back-up ring section and a second clamp hinge positioned proximate a first end of a second back-up ring section, said first clamp hinge and said second clamp hinge provided with clamp hinge apertures adapted to align and receive a clamp pin to hinge said back-up ring around the pipe.

5. The sealing device of claim 4, wherein said latch further comprises a first end tab positioned proximate a second end of said first back-up ring section and a second end tab positioned proximate a second end of said second back-up ring section, said first end tab and said second end tab provided with tab apertures adapted to align and receive a tab pin to latch said back-up ring around the pipe.

6. The sealing device of claim 1, wherein said plurality of bolt supports further comprises a first bolt support and a second bolt support configured to extend from an exterior surface of said back-up ring, said first bolt support and said second bolt support provided with bolt apertures adapted to align and receive a bolt pin to pivotably connect each of said plurality of swing bolts to said back-up ring.

7. The sealing device of claim 6, wherein said ring tongue and said first bolt support and said second bolt support are provided with hinge attachment apertures adapted to align and receive a ring tongue pin to connect said first bolt support and said second bolt to said ring tongue.

8. The sealing device of claim 1, wherein said lid further comprises a circular groove configured in said interior surface within said plurality of open ended bolt slots.

9. The sealing device of claim 8, wherein said lid further comprises a gasket positioned therein said gasket groove to seal said interior surface of said lid thereto the flanged end of the pipe.

10. The sealing device of claim 1, wherein said lid further comprises a washer slot configured in an exterior surface of said lid adjacent said bolt slot, said washer slot to align with a washer of said hand operable fastener.

11. The sealing device of claim 1, wherein said lid further comprises an access portal to enable access to the pipe without breaking the seal between said lid and the flanged end of the pipe.

12. A method of sealing a flanged end of a pipe, said method comprising the steps of:

providing a pipe seal having a back-up ring, said back-up ring having a pair of substantially semi-circular back-up ring sections hingedly connected by a clamp hinge positioned proximate a first end of said back-up ring sections and a second end of said back-up ring sections configured with a latch, said back-up ring having a plurality of bolt supports radially positioned about an outer surface of said back-up ring, a lid configured as a disk having a perimeter edge and a flat interior surface to abut the flanged end, said lid having a plurality of open ended bolt slots radially positioned about said perimeter edge, a lid hinge to hingedly connect said lid to said back-up ring, said lid hinge having a ring tongue extending radially from an outer surface of said back-up ring, said ring tongue having a pair of vertical hinge posts affixed to said ring tongue, each said pair of vertical hinge posts having an adjustment slot, said lid hinge having a lid tongue extending radially from a perimeter edge of said lid, said lid tongue having a lid tongue aperture positioned between said pair of vertical hinge posts and aligned with said adjustment slot, a plurality of swing bolts each pivotably affixed to one of said plurality of bolt supports, said plurality of swing bolts having a hand operable fastener;

positioning said back-up ring on the pipe inward of the flanged end; and latching said back-up ring in a closed position around the pipe.

13. The method of claim 12, further comprising the step of tightening a set screw positioned therethrough said back-up ring to retain said back-up ring proximate the flanged end of the pipe.

14. The method of claim 13, further comprising the step of attaching said lid to said back-up ring via insertion of a hinge pin therethrough said adjustment slot and said lid tongue aperture.

15. The method of claim 14, further comprising the step of adjusting said lid about said adjustment to enable said lid to lay flat against the flanged end of the pipe in a closed position.

16. The method of claim 15, further comprising the step of swinging each of said plurality of swing bolts into said bolt slots positioning said hand operable fasteners above an exterior surface of said lid.

17. The method of claim 15, further comprising the step of tightening said hand operable fasteners by rotation of said hand operable fasteners.

18. The method of claim 15, further comprising the step of sealing said lid to the flanged end of the pipe.

19. The method of claim 15, further comprising the step of opening an access portal to enable access to the pipe.

\* \* \* \* \*